(12) United States Patent
Kaleem et al.

(10) Patent No.: US 7,179,376 B2
(45) Date of Patent: Feb. 20, 2007

(54) METHOD AND SYSTEM FOR REMOVING RESIDUAL WATER FROM EXCESS WASHCOAT BY ULTRAFILTRATION

(75) Inventors: Kareem Kaleem, Loveland, OH (US); Kris Kazik, West Chester, OH (US); Rebecca A. Fron, Cincinnati, OH (US)

(73) Assignee: PPG Industries Ohio, Inc., Clevelamd, OH (US)

( * ) Notice: Subject to any disclaimer, the term of this patent is extended or adjusted under 35 U.S.C. 154(b) by 253 days.

(21) Appl. No.: 10/720,873

(22) Filed: Nov. 24, 2003

(65) Prior Publication Data

US 2005/0115902 A1   Jun. 2, 2005

(51) Int. Cl.
*B01D 63/00* (2006.01)
*C02F 9/00* (2006.01)
*B01D 61/00* (2006.01)

(52) U.S. Cl. .............................. 210/195.2; 210/257.2; 210/650; 210/651; 134/10

(58) Field of Classification Search .......... 210/65–652, 210/712, 195.2, 333.1; 204/472, 622, 489; 220/458; 134/10, 12, 18, 26, 29, 22.12
See application file for complete search history.

(56) References Cited

U.S. PATENT DOCUMENTS

| 4,160,726 A * | 7/1979 | DelPico ................ 523/310 |
|---|---|---|
| 4,201,664 A * | 5/1980 | Hekal .................. 508/111 |
| 4,340,702 A * | 7/1982 | Huddleston et al. .......... 526/70 |
| 5,076,939 A * | 12/1991 | Hunter et al. ................ 210/712 |
| 5,201,436 A * | 4/1993 | Owens et al. ............ 220/62.12 |
| 5,236,974 A * | 8/1993 | Dreischhoff et al. ........ 523/403 |
| 5,296,525 A | 3/1994 | Spencer ...................... 523/408 |
| 5,342,863 A * | 8/1994 | Buckley et al. ............. 523/310 |
| 5,527,840 A | 6/1996 | Chutko et al. ............. 523/412 |
| 5,554,296 A * | 9/1996 | Zakhary ..................... 210/702 |
| 5,635,049 A | 6/1997 | Mysliwczyk et al. ....... 204/504 |
| 5,723,555 A * | 3/1998 | Swarup et al. .............. 526/210 |
| 5,836,321 A * | 11/1998 | Kaneski et al. ................ 134/10 |
| 5,873,945 A * | 2/1999 | Patzelt et al. ................. 134/12 |
| 5,972,432 A | 10/1999 | Chutko et al. ............. 427/386 |
| 6,001,922 A * | 12/1999 | Clark et al. ................. 524/513 |
| 6,004,628 A | 12/1999 | Spellane et al. ............. 427/435 |
| 6,077,437 A * | 6/2000 | Hayashi et al. ............. 210/651 |
| 6,225,434 B1 | 5/2001 | Sadvary et al. ............... 528/29 |
| 6,248,809 B1 * | 6/2001 | Buckley et al. ............. 523/310 |
| 6,359,062 B1 * | 3/2002 | Mallen ......................... 525/58 |
| 6,872,291 B2 * | 3/2005 | Boyd et al. ................. 204/472 |

FOREIGN PATENT DOCUMENTS

| GB | 1445070 | 5/1975 |
|---|---|---|
| WO | WO 96/07775 | * 9/1995 |

* cited by examiner

*Primary Examiner*—Ana Fortuna
(74) *Attorney, Agent, or Firm*—Donald R. Palladino

(57) ABSTRACT

A washcoat coating composition is disclosed that includes at least one water insoluble organic solvent and at least one polymer, such as an epoxy acrylic copolymer. A method of removing residual water from a mixture of residual water and washcoat using ultrafiltration is also disclosed. A method of coating a metal article and a washcoat system for applying a washcoat to a metal article is also disclosed.

23 Claims, 1 Drawing Sheet

METHOD AND SYSTEM FOR REMOVING RESIDUAL WATER FROM EXCESS WASHCOAT BY ULTRAFILTRATION

BACKGROUND OF THE INVENTION

1. Field of the Invention

The present invention relates to the manufacture of metal containers, such as cans, that are coated with a polymer "washcoat" coating. More particularly, the present invention relates to the removal of water from a mixture of washcoat and residual water that may be formed during the manufacture of such containers.

2. Background of the Invention

"Two-piece" containers, which are common in the production of food and beverage cans, are manufactured through a drawing and ironing ("D&I") process using suitable metal cups to form a cylindrical body and base (sometimes referred to as the "shell") as a single first piece, with a lid, constituting a second piece. Another type of can, a "three-piece" can, is manufactured from a cylindrical piece and two end pieces.

The metal cups and the dies that are used in the D&I operation of a two-piece can manufacturing process typically utilize a lubricant, such as oil, to facilitate that operation. During the drawing operation, however, the lubricant often comes in contact with surfaces of the can and subsequently remains adhered thereto. Therefore, cans are typically washed with an acid or caustic material to remove any such lubricant prior to application of a protective coating layer. Following this wash, the can is typically rinsed with water, sometimes in several rinse stages. Once rinsed, a coating termed a "washcoat" (defined below) is typically applied to the can.

Following the rinse step, however, residual water or other contaminants may be in contact with surfaces of the can. In addition to coating the cans, therefore, the washcoat operation may also incidentally remove contaminants as well. In a typical system for applying a washcoat coating, cans pass through a curtain of the washcoat. Washcoat that does not adhere to the exterior surface of the can may carry residual water, or other contaminants, with it and be recirculated for future use.

The residual water that is carried with the washcoat, however, dilutes the washcoat, thereby potentially leading to poor or low film weight control and, as a result, inadequate performance. In some situations, the addition of concentrated washcoat to correct the over dilution is impractical or undesirable. In such cases, for example, it would be desirable to remove over diluted material from the system to make room for concentrated washcoat so that proper washcoat film weights can be achieved.

Accordingly, there is a need for a method of removing residual water from washcoat.

SUMMARY OF THE INVENTION

The present invention is directed to methods of removing residual water from a mixture of residual water and washcoat, wherein the washcoat comprises at least one polymer and at least one water insoluble organic solvent. The methods comprise passing the mixture of the residual water and the washcoat through an ultrafilter wherein the residual water is substantially separated from the washcoat.

The present invention is also directed to methods of coating a metal article. These methods of the present invention comprise the steps of: (a) rinsing the article with water; (b) coating at least a portion of the article with a washcoat comprising at least one polymer and at least one water insoluble organic solvent, wherein the coating step substantially removes water from a surface of the metal article, wherein a mixture of washcoat and residual water is passed through an ultrafilter that substantially separates the residual water from the washcoat; and (c) curing the washcoat coating that has been deposited on the article.

The present invention is also directed to washcoat systems for applying a washcoat to a metal article that has been rinsed with water. The systems of the present invention comprise: (a) a washcoat comprising at least one polymer and at least one water insoluble organic solvent; (b) a coater that removes residual water from the metal article, coats at least a portion of the article with the washcoat, and generates a mixture of washcoat and residual water; and (c) an ultrafilter through which the mixture of washcoat and residual water passes, wherein the water is substantially separated from said washcoat.

For purposes of the following detailed description, it is to be understood that the invention may assume various alternative variations and step sequences, except where expressly specified to the contrary. It is also to be understood that the specific devices and processes illustrated in the attached drawing, and described in the following specification, are simply exemplary embodiments of the invention. Hence, specific dimensions and other physical characteristics related to the embodiments disclosed herein are not to be considered as limiting. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any-numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

DETAILED DESCRIPTION OF THE INVENTION

Figure 1:
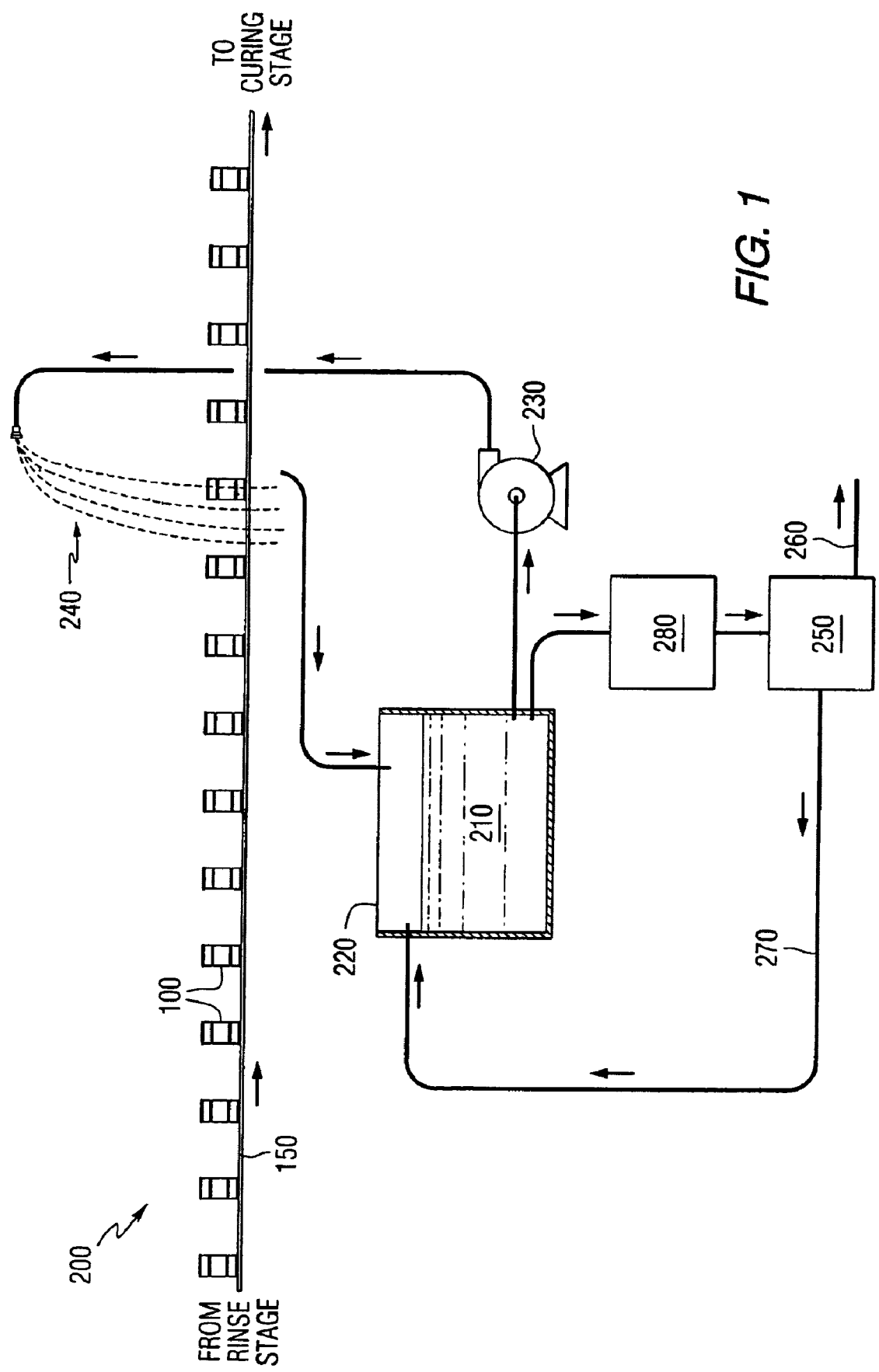
FIG. 1 is a schematic illustration of a system for removing residual water from a washcoat in accordance with a non-limiting embodiment of the present invention.

The present invention is directed to methods of removing residual water from a mixture of residual water and washcoat, wherein the washcoat comprises at least one polymer and at least one water insoluble organic solvent. The methods comprise passing the mixture of the residual water and the washcoat through an ultrafilter wherein the residual water is substantially separated from the washcoat.

Referring now to FIG. 1, there is seen a schematic diagram illustrating a system for removing residual water from a mixture of residual water and washcoat in accordance with a non-limiting embodiment of the present invention. Typically, there are several stages in, for example, a two-piece can manufacturing process. In a drawing stage, cans are drawn from a metal cup to form a cylindrical body and a base. The cans may be formed from any metal typically used in such processes such as, for example, tinplate, aluminum, and tin free steel.

Next, the cans pass through a wash stage. In the wash stage, the cans are washed, usually via spray, with an acid or caustic solution such as, for example, DR-1534C from PPG Industries, Inc., QUAKLEEN® 607HW, QUAKEROL™ 509M, and/or QUINTOLUBRIC® 804 GL70 from Quaker Chemical Corporation to remove lubricants, such as oil, or other contaminants from the exterior and/or interior surfaces of the cans. Third, the cans-pass through a rinse stage where the cans are rinsed with deionized water, typically via spray. As will be appreciated by those skilled in the art, more than one rinse stage may be employed. Fourth, the cans pass through a washcoat stage. Fifth, the cans pass through a curing stage in which the washcoat coating that has been deposited on the cans in the washcoat stage is cured.

Turning now to the particulars of the washcoat stage, reference is made to FIG. 1 in which a washcoat system 200 is depicted that includes a washcoat coating 210 shown stored in reservoir 220. As used herein, the term "washcoat" or "washcoat coating" refers to a coating applied to the exterior of a two piece can by any method such as, for example, curtain coat application, rollcoat application, spray application, or electrocoat application. Often, the washcoat protects the can from corrosion. For example, the washcoat may be a coating that protects a can from visible corrosion after exposing the can to a steam process, which is typical in the food can industry at, for example, 90 minutes at 275° F. In some cases, a washcoat coating may be a relatively thin, at least semi-transparent coating having a thickness of about 0.2 mil or less.

The washcoat 210 used in the present invention is a composition that comprises at least one polymer and at least one water insoluble organic solvent. In certain non-limiting embodiments of the present invention, the washcoat is a composition that comprises a dispersion of at least one polymer and at least one water insoluble organic solvent in a continuous phase that includes water and, optionally, at least one substantially water soluble organic solvent. As used herein, the term "polymer" is intended to generically encompass oligomers and both homopolymers and copolymers. In certain embodiments of the present invention, the washcoat 210 that is used may include 10 to 40 wt. % of the polymer based on the total weight of the washcoat. In other embodiments, the washcoat 210 that is used includes 15 to 30 wt. % or, in yet other embodiments, 20 to 25 wt % of the polymer based on the total weight of the washcoat.

In certain embodiments of the present invention the polymer comprises an epoxy acrylic copolymer. Moreover, in certain embodiments of the present invention, the copolymer may include 10 to 99 wt. % of the epoxy and 1 to 90 wt % of the acrylic based on the total weight of the epoxy acrylic polymer. In other embodiments of the present invention, the epoxy acrylic copolymer that is used may include 20 to 90 wt. % of the epoxy and 10 to 80 wt % of the acrylic, or, in other embodiments, 30 to 80 wt. % of the epoxy and 20 to 70 wt % of the acrylic based on the total weight of the epoxy acrylic polymer. Alternatively, other suitable polymers may be used, such as, for example, acrylics, polyesters, vinyls, polyvinyl buterols, urethanes, isocyanates, polyols, epoxy phosphate, and/or any graft or block copolymers and/or combinations thereof.

When the washcoat 210 that is used in certain embodiments of the present invention is an epoxy acrylic copolymer, the acrylic may comprise, for example, a copolymer of at least one polymerizable, ethylenically unsaturated carboxylic acid monomer and at least one copolymerizable nonionic monomer. Suitable $\alpha,\beta$ unsaturated carboxylic acid monomers include, without limitation, (meth)acrylic acid, maleic acid, crotonic acid, mesaconic acid, citraconic acid, sorbic acid, fumaric acid, and itacnonic acid. The acrylic monomer may also include acrylamide, methacrylamide, isobutoxymethyl acrylamide, and n-butoxylmethacrylamide or the like, which can render the polymer water dispersible. As used herein, "(meth)acrylic" and like terms is intended to include both acrylic and methacrylic. Suitable copolymerizable nonionic monomers include nonionic ethylenically unsaturated monomers, such as vinyl aromatic compounds and alkyl esters of ethylenically unsaturated carboxylic acids. Included among such monomers are, without limitation, lower alkyl acrylates, lower alkyl methacrylates, styrene, alkyl-substituted styrenes, vinyl acetate and acrylonitrile. In accordance with certain embodiments of the present invention, the acrylic monomer comprises methyl acrylate, methyl methacrylate, ethyl acrylate, butyl acrylate, acrylic acid, methacrylic acid, and/or mixtures thereof.

In accordance with certain embodiments of the present invention, the acrylic polymers are polymerized using a free radical initiator, as is known to those skilled in the art. Useful free radical initiators include, without limitation, redox initiators, peroxide type catalysts, such as, for example, cumene hydroperoxide, or azo compounds, such as, for example, azobisisobutyronitrile. These initiators can be used singly or in a suitable mixture to achieve suitable acrylic resins.

In certain embodiments of the present invention, the acrylic polymer used in the epoxy acrylic copolymer may have a theoretical glass transition temperature (Tg) of 63° C.–140° C., or, in some embodiments, from 100° C.–130° C., wherein Tg is calculated based on the amounts of each monomer in the acrylic. For example, when the acrylic contains three monomers, the theoretical Tg is calculated according to the following formula:

$$\frac{1}{Tg} = \frac{(\text{wt. \%) Monomer } A}{(Tg) \text{ Monomer } A} + \frac{(\text{wt. \%) Monomer } B}{(Tg) \text{ Monomer } B} + \frac{(\text{wt. \%) Monomer } C}{(Tg) \text{ Monomer } C}$$

Similar formulas would be appropriate in circumstances wherein the acrylic contains more or less than three monomers.

In certain embodiments of the present invention, the composition of the washcoat that is used may include an acrylic comprising a terpolymer of 20 to 50 wt % of methacrylic acid, 50 to 80 wt % of styrene and 1 to 20 wt % ethyl acrylate based on the total weight of the acrylic.

As used herein, the term "epoxy" refers to any thermosetting resin that is based on the reactivity on the epoxide group and hydroxyl group on the backbone of the polymer. The washcoat 210 used in the present invention may include, for example, glycidyl polyethers having more than one epoxide group per molecule, such as glycidyl polyethers having an average of about 1.0 to about 2.5 epoxide groups per molecule. Diglycidyl ethers of dihydric phenols, for example, are suitable for use in the washcoat used in the present invention. Dihydric phenols include, for example, resorcinol, 1,5-dihydroxy naphthalene and bisphenols, such as Bisphenol A (p,p'-dihydroxy-2,2-diphenyl propane). Aromatic epoxy compounds or aliphatic epoxy compounds, including aliphatic polyols such as glycerol may be used in the washcoat used in the present invention. Epoxies that may be used in the present invention include those derived from the reaction of the dihydric phenol, and an epihalohydrin, such as epichlorohydrin. Molecular weight of the initial reaction product may be increased by reaction with additional dihydric phenol. Epoxies suitable for use in the present invention include, without limitation, those having epoxide equivalent weights ("EEW") of between 180 and 20,000, or, in some cases, from 1,000 to 12,000. Epoxy compounds, such as Diglycidyl ethers of Bisphenol A are commonly available in commerce, and commercial materials such as EPON 1009F and EPON 1007F (both available from Shell Chemical Company, Houston, Tex.) are suitable for use in the composition of a washcoat used in the present invention. These epoxy compounds can also be prepared by advancing a low molecular weight epoxy compound by standard methods well known to those skilled in the art, e.g., advancing an epoxy resin having an EEW of about 180 to about 500 with Bisphenol A to produce an epoxy compound having an EEW of about 1,000 to about 12,000.

The washcoat 210 that is used in the present invention also comprises one or more water insoluble solvents. As used herein, the term "water insoluble solvent" refers to any organic solvent having solubility of 5% or less in water by weight at 20° C. and/or a total solubility parameter of 8.0 to 11.5. In certain embodiments of the present invention, the water insoluble solvent has a solubility of 1% or less in water by weight at 20° C. Examples of water insoluble solvents include, without limitation, 2-ethylhexanol, methyl n-amyl ketone, methyl isobutyl ketone, Eastman C-11 Ketone (a mixture of ketone solvents available from Eastman Chemical Company), Ektasolve EEH (ethylene glycol mono-2-ethyl hexyl ether available from Eastman Chemical Company) and Hexyl Cellosolve (ethylene glycol monohexyl ether available from Dow Chemical Company), Texanol (2,2,4-trimethyl-1,3-pentanediol monoisobutrate available from Eastman Chemical Company), Dibasic Ester, and mixtures thereof. Examples of solvents that are not "water insoluble solvents" include acetone, butanol, ethanol, propanol, and ethylene glycol monethyl ether. In certain embodiments of the present invention, the water insoluble solvent of the washcoat 210 used in the present invention comprises Hexyl Cellosolve.

In certain embodiments of the present invention, the water insoluble solvent is also a "high boiling solvent." As used herein, the term "high boiling solvent" refers to any solvent having a boiling point of more than 50° C. at 1 atmosphere pressure. In certain embodiments of the present invention, the high boiling solvent has a boiling point of more than 100° C. at 1 atmosphere pressure. Non-limiting examples of water insoluble solvents that are also high boiling solvents include the water insoluble solvents listed above.

In certain embodiments of the present invention, the washcoat 210 used in the present invention may include from 1 to 10 wt. % of the water insoluble solvent based on the total weight of the washcoat. In other embodiments, the washcoat 210 includes 1 to 5 wt. % or, in other embodiments, 1 to 4 wt. % of the water insoluble solvent based on the total weight of the washcoat.

The washcoat 210 used in the present invention may also include one or more crosslinking or curing agents, which bring about chemical crosslinking after the washcoat is deposited. In certain embodiments of the present invention, the washcoat that is used may include 1 to 30 wt. % of a crosslinking agent based on the total weight of the washcoat. In other particular embodiments, the washcoat that is used includes 1 to 10 wt. % or, in yet other embodiments, 1 to 4 wt. % of the crosslinking agent based on the total weight of the washcoat.

Non-limiting examples of suitable curing agents include aminoplast resins and/or phenoplast resins, including mixtures thereof. In certain embodiments of the present invention, the curing agent is an aminoplast resin, such as, for example, an alkylated methylol melamine resin, an alkylated methylol urea, or similar compounds. Products obtained from the reaction of alcohols and formaldehyde with melamine, urea or benzoguanamine may be used. Condensation products of other amines and amides may also be employed, however, including, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some non-limiting examples of such compounds are N,N'-dimethyl urea, benzourea, dicyandimide, formaguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like.

While the aldehyde employed is often formaldehyde, other similar condensation products can be made from other aldehydes, such as acetaldehyde, crotonaldehyde, acrolein, benzaldehyde, furfural, glycol and the like.

In certain embodiments of the present invention, the curing agent is a phenoplast resin, such as, for example, those formed by the condensation of an aldehyde, such as formaldehyde, and a phenol. Methylene-releasing and aldehyde-releasing agents, such as paraformaldehyde and hexamethylene tetramine, can be utilized as the aldehyde agent. Various phenols can be used; for instance, the phenol employed can be phenol per se, a cresol, or a substituted phenol in which a hydrocarbon radical having either a straight chain, a branched chain or a cyclic structure is substituted for a hydrogen in the aromatic ring. Mixtures of phenols may also be employed. Some specific examples of phenols utilized to produce these resins include, without limitation, p-phenylphenol, p-tert-butylphenol, p-tert-amylphenol, cyclopentylphenol and unsaturated hydrocarbon-substituted phenols, such as the monobutenyl phenols containing a butenyl group in ortho, meta or para position, and where the double bond occurs in various positions in the hydrocarbon chain. One common phenolic resin is phenol formaldehyde.

As mentioned previously, in certain embodiments of the present invention, the washcoat 210 that is used comprises a dispersion of at least one polymer and at least one water insoluble organic solvent in a continuous phase that includes water and optionally, one or more substantially water soluble organic solvents. As used herein, the term "substantially water soluble" means that the organic solvent has a solubility of more than 50% or higher in water at 20° C. In certain embodiments of the present invention, the substantially water soluble organic solvent is completely soluble in water.

In certain embodiments, the washcoat 210 used in the present invention has a continuous phase that includes 40 to 90 wt. % water based on the total weight of the washcoat. In other particular embodiments, the continuous phase includes 40 to 85 wt. % or, in yet other embodiments, 40 to 80 wt. % water based on the total weight of the washcoat. In certain embodiments, the continuous phase may include 1 to 8 wt. % of the substantially water soluble organic solvent based on the total weight of the washcoat, or, in other embodiments, 1 to 4 wt. %, or, in yet other embodiments, 1 to 3 wt. % of the substantially water soluble organic solvent based on based on the total weight of the washcoat.

The substantially water soluble organic solvent may be either in the form of a singular polar compound or as a mixture of compounds which may include non-polar components. The substantially water soluble organic solvent may be capable of dissolving the at least one polymer, thereby facilitating their dispersion in an aqueous solution. Suitable solvents, to be used either alone or as part of a mixture, include, for example, glycol ethers and alcohols such as alkanols, monoalkyl glycols, and alkyl carbitols (diethylene glycol monoalkyl ethers). Alcohols, such as butyl alcohols (e.g., n-butanol), 2-butoxyethanol, Butyl Carbitol (diethylene glycol monobutyl ether), may be used. Non-polar solvents may also be included as minor constituents of the organic solvent. Suitable non-polar solvents that may be used include: aliphatic and aromatic hydrocarbons, such as naphtha, heptane, mineral spirits, toluene and the like.

The washcoat 210 used in the present invention may also include a sufficient amount of volatile amine or fugitive base, such as, for example, N,N-Dimethylethanolamine, to promote appropriate dispersion of the polymer in water. The amount of volatile amine may be varied to obtain a stable dispersion during application. Other volatile amines that may be used in the washcoat 210 of the present invention include, without limitation, ammonium hydroxide, tetra alkyl ammonium hydroxides, monoethanol amine, dimethyl amine, methyldiethanol amine, benzyl amine, diisopropyl amine, methyl ethanol amine, butyl amine, dimethylethanol amine, diethyl ethanol amine, morpholine, piperazine, N-methyl morpholine, triethyl amine, N-ethyl morpholine, triethylamine, tributyl amine, N-methyl piperidine, 2-amino-2-methyl-1-propanol, piperidine, pyridine, dimethyl aniline, and similar amines and alkanolamindes and mixtures thereof.

The washcoat 210 used in the present invention may include other additives such as, for example, lubricants, coalescing solvents, leveling agents, wetting agents, thickening agents, suspending agents, surfactants, defoamers, adhesion promoters, corrosion inhibitors, pigments, and the like. Examples of suitable surfactants and wetting agents include, without limitation, alkyl imidazolines such as those available from Geigy Industrial Chemicals as GEIGY AMINE C, and acetylenic alcohols available from Air Products and Chemicals as SURFYNOL. Examples of defoamers include, without limitation, a hydrocarbon containing inert diatomaceous earth available from Crucible Materials Corp. as FOAMKILL 63. Examples of anti-cratering agents include, without limitation, polyepoxide-polyoxyalkylene-polyamine reaction products such as those described in U.S. Pat. No. 4,423,166. Examples of lubricants include, without limitation, polyethylene, polytetrafluoroethylene, carnuba, microcrystalline lube, and any other naturally occurring lubes.

In certain embodiments, the washcoat 210 used in the present invention may be prepared by post adding the water insoluble solvent to an existing washcoat composition that includes at least one polymer and a water soluble organic solvent. For example, one or more water insoluble solvents may be post added to an aqueous-based epoxy acrylic copolymer washcoat composition, among others. Alternatively, the paint manufacturer may formulate the washcoat 210 used in the present invention such that it includes at least one polymer and an insoluble organic solvent. One particular washcoat that may be used in the present invention is PPG1026803 acrylic epoxy resin available from PPG Industries, Inc, which is a dispersion of an acrylic epoxy copolymer and a water insoluble organic solvent in a continuous phase that includes water.

Referring now once again to FIG. 1, wherein the washcoat 210 is shown stored in reservoir 220, it is seen that the cans 100 pass from the rinse stage and into the washcoat stage on conduit 150. In the non-limiting embodiment of the present invention depicted in FIG. 1, the washcoat coater is a curtain of washcoat 240 that is transferred from the reservoir 220, such as by pump 230, and brought into contact with the cans 100 to coat the exterior surface of the cans 100.

As is also apparent from FIG. 1, some of the washcoat 210 in the curtain of washcoat 240 does not coat a can 100 but, instead, travels to the reservoir 220 and then to ultrafilter 250. Moreover, as is also apparent, the coater may also incidentally remove contaminants, particularly water, from the exterior surface of the cans 100. As illustrated in FIG. 1, these contaminants are carried with the washcoat and eventually pass to ultrafilter 250. As used herein, the term "residual water" refers to any water that passes through ultrafilter 250 that is not part of the composition of washcoat 210.

As will be apparent to those skilled in the art, because the coater incidentally removes contaminants, particularly water, from the exterior surface of the cans 100, a mixture of residual water and washcoat is formed as a result of the coating operation. In accordance with the present invention, this residual water is substantially removed from the mixture by an ultrafilter 250.

As used herein, the term "ultrafilter" refers to any filter capable of separating components of a solution or mixture on the basis of molecular size and/or shape. In one example, an ultrafilter may operate such that under an applied pressure difference across an ultrafiltration membrane, solvent and small solute species pass through the membrane and are collected as permeate while larger solute species are retained by the membrane and recovered as a concentrated retenate.

In accordance with the present invention, and as shown in FIG. 1, the mixture of washcoat and residual water passes through an ultrafilter 250. In the ultrafilter 250, the residual water is substantially separated from the washcoat, thereby forming a permeate 260 and a retenate, or washcoat component 270. In certain embodiments of the present invention, the ultrafilter 250 may be designed to retain materials have a molecular weight of at least 1,000 up to 100,000.

As used herein, the term "substantially separated" means that sufficient water is separated from the mixture of residual water and the washcoat to maintain a desired film weight of the washcoat 210. In certain embodiments of the present invention, for example, the ultrafilter removes at least 99.9% of the residual water from the mixture of the residual water and the washcoat. Moreover, the ultrafilter 250 removes little of the total solvent from the washcoat to the permeate 260. In one embodiment of the present invention, the permeate 260 exiting the ultrafilter 250 comprises at least 95 wt % water, or, in other embodiments, at least 99 wt % water based on the total weight of the permeate. Moreover, in certain embodiments, the permeate 260 exiting the ultrafilter comprises no more than 5 wt % total organic solvents, or, in other embodiments, 0.5 to 1.0% total organic solvents based on the total weight of the permeate. As depicted in FIG. 1, the washcoat component 270 may be recirculated after passing through the ultrafilter and returned to reservoir 220.

In an embodiment of the present invention, such as is depicted in FIG. 1, the mixture of the washcoat and residual water may also pass through a prefilter 280 prior to passing through the ultrafilter 250. The prefilter 280, when used, may remove particulates or other matter to prevent fouling of the ultrafilter 250. In one embodiment, for example, the prefilter 280 is a bag filter having a pore size of no more than 50 microns.

Without being bound by any theory, it is believed that the particular composition of washcoat 210 promotes the efficient and effective removal of residual water from the washcoat through ultrafiltration as described above. Specifically, it is believed that the inclusion of at least one water insoluble solvent provides polymer resolubility, which enables the mixture of the residual water and the washcoat to pass through the prefilter 280 without plugging. It is also believed that the inclusion of at least one water insoluble solvent minimizes the amount of low molecular weight materials, such as solvents, from being filtered out into the permeate.

Illustrating the invention are the following examples, which, however, are not to be considered as limiting the invention to their details. Unless otherwise indicated, all parts and percentages in the following examples, as well as throughout the specification, are by weight.

EXAMPLES

Example 1 describes the analysis of an ultrafilter permeate from a washcoat comprising an aqueous dispersion of an epoxy acrylic copolymer in a continuous phase comprising water and water soluble organic solvents. Example 2 describes the analysis of an ultrafilter permeate from a washcoat comprising an aqueous dispersion of an epoxy acrylic copolymer and at least one water insoluble organic solvent in a continuous phase comprising water and water soluble organic solvents.

In both examples, the washcoat was prepared in the laboratory and reduced to a 10% solution in deionized water. Reduced materials from both samples were then passed separately through a laboratory ultrafiltration unit for about 30 minutes. Paint material not filtered out was recirculated back into the original container. Permeate (low molecular weight material) filtered out was collected and submitted for analysis.

In both examples, the effluent was analyzed using a model 6890 Gas Chromatograph/Flame Ionization Detector available from Agilent Technologies using butyl carbitol as an internal standard.

Example 1

PPG 1026802, a washcoat coating available from PPG Industries, Inc. was reduced to a 10% solution and passed through an ultrafilter as described above. PPG 1026802 is a commercially available dispersion of an acrylic epoxy copolymer in a continuous phase that includes water and water soluble solvents, namely, butyl cellosolve (approximately 5.4 wt. % based on the total weight of the coating) and n-butyl alcohol (approximately 0.5 wt. % based on the total weight of the coating). Table 1 illustrates the amount of these components in the permeate.

TABLE 1

| | |
|---|---|
| n-Butyl Alcohol | 0.07% |
| Butyl Cellosolve | 1.04% |
| TOTAL | 1.11% |

Example 2

PPG 1026803, a washcoat coating available from PPG Industries, Inc. was reduced to a 10% solution and passed through an ultrafilter as described above. PPG 1026803 is a commercially available coating that includes a water insoluble solvent, an acrylic epoxy copolymer, and a continuous phase that includes water and water-soluble solvents. In particular, the water-soluble solvents are butyl cellosolve (approximately 2.6 wt. % based on the total weight of the coating) and n-butyl alcohol (approximately 0.4 wt. % based on the total weight of the coating). The water insoluble solvent is Hexyl Cellosolve (approximately 2.9 wt. % based on the total weight of the coating). Table 2 illustrates the amount of these components in the permeate.

TABLE 2

| | |
|---|---|
| n-Butyl Alcohol | 0.057% |
| Hexyl Cellosolve | 0.074% |
| Butyl Cellosolve | 0.245% |
| TOTAL | 0.376% |

As the above results show, the coating composition with only water soluble solvents, shown in Example 1, had more solvent extraction in the permeate, in excess of 1%, than the coating composition that includes a water insoluble solvent, shown in Example 2. Permeate analysis found less solvent extraction, less than 0.5%, for the composition containing water insoluble solvents. Thus, the composition including at least one water insoluble solvent allowed for a more efficient and effective method of separating residual water from washcoat.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A washcoat system for applying a washcoat to a metal food or beverage can having water from a water rinse in contact with an exterior surface of the can, the system comprising a curtain of washcoat in flow communication with:

(a) a reservoir in which the washcoat is stored,
(b) a prefilter, and
(c) an ultrafilter, wherein:
  (i) the washcoat comprises at least one polymer and at least one water insoluble organic solvent;
  (ii) the curtain of washcoat removes residual water from the can, coats at least a portion of the can with the washcoat, and generates a mixture of washcoat and residual water;
  (iii) the mixture of washcoat and residual water is in flow communication with the reservoir;
  (iv) the reservoir is in flow communication with a prefilter through which the mixture passes prior to passing through the ultrafilter; and
  (v) the residual water is substantially separated from the mixture of washcoat and residual water by the ultrafilter, thereby forming a permeate and a washcoat component, wherein the washcoat component is in flow communication with the reservoir.

2. The system of claim 1 wherein the washcoat comprises a dispersion of at least one polymer and at least one water insoluble solvent in a comprises phase comprising water.

3. The system of claim 2 wherein the polymer comprises an epoxy acrylic copolymer.

4. The system of claim 3 wherein the acrylic has a Tg of 63 to 140° C.

5. The system of claim 3 wherein the acrylic is a terpolymer of 20 to 50 wt % methacrylic acid, 50 to 80 wt% of styrene, and 1 to 20 wt% of ethyl acrylic, based on the total weight of the acrylic.

6. The system of claim 3 wherein the epoxy comprises a diglycidyl ether of Bisphenol A.

7. The system of claim 3 wherein the acrylic is present in the washcoat in an amount ranging from 1 to 90 wt % based on the total weight of the epoxy acrylic polymer.

8. The system of claim 3 wherein the epoxy is present in the washcoat in an amount ranging from 10 to 100 wt % based on the total weight of the epoxy acrylic polymer.

9. The system of claim 2 wherein water is present in the continuous phase of the washcoat in an amount ranging from 40 to 90 wt % based on the total weight of the washcoat.

10. The system of claim 2 wherein the water insoluble solvent is a high boiling solvent.

11. The system of claim 2 wherein the continuous phase of the washcoat further comprises a substantially water soluble solvent.

12. The system of claim 11 wherein the substantially water soluble solvent is selected from the group consisting of a glycol ether, an alcohol, a monoalkyl glycol, an alkyl carbitol, and mixtures thereof.

13. The system of claim 11 wherein the substantially water soluble solvent is present in the continuous phase of the washcoat in an amount ranging from 1 up to 8 wt % based on the total weight of the washcoat.

14. The system of claim 1 wherein the water insoluble solvent is selected from the group consisting of ethylene glycol monohexyf ether, 2-ethylhexanol, methyl n-emyl ketone, methyl isobutyl ketone, mixtures of ketone solvents, ethylene glycol mono-2-ethyl hexyl ether, 2,2,4-trimethyl-1,3-pentanediol monoisobutyrate, Dibasic Ester, and mixtures thereof.

15. The system of claim 1 wherein the polymer is present in the washcoat in an amount ranging from 10 to 40 wt % based on the total weight of the washcoat.

16. The system of claim 1 wherein the water insoluble solvent is present in the washcoat in an amount ranging from 1 to 10 wt % based on the total weight of the washcoat.

17. The system of claim 1 wherein the ultrafilter removes at least 99.9% of the residual water from the mixture of the residual water and washcoat.

18. The system of claim 1 wherein a permeate comprising at least 95 wt % water based on the total weight of the permeate exits the ultrafilter.

19. The system of claim 18 wherein the permeate comprises at least 99 wt% water based on the total weight of the permeate.

20. The system of claim 1 wherein a permeate comprising no more than 5 wt % organic solvents based on the total weight of the permeate exits the ultrafilter.

21. The system of claim 20 wherein the permeate comprises 0.5 to 1 wt % organic solvents based on the total weight of the permeate.

22. The system of claim 1 wherein the ultrafilter retains materials having a molecular weight of at least 1.000.

23. The system of claim 1 wherein the prefilter is a bag filter having a pore size of no more than 50 microns.

* * * * *

UNITED STATES PATENT AND TRADEMARK OFFICE
CERTIFICATE OF CORRECTION

PATENT NO. : 7,179,376 B2
APPLICATION NO. : 10/720873
DATED : February 20, 2007
INVENTOR(S) : Kareem Kaleem et al.

It is certified that error appears in the above-identified patent and that said Letters Patent is hereby corrected as shown below:

On the title page, item (73), "Clevelamd" should be --Cleveland--.

Col. 11, line 22, "comprises" should be --continuous--.

Col. 11, line 29, "acrylic" should be --acrylate--.

Col. 12, line 12, "emyl" should be --amyl--.

Col. 12, line 41, "1.000" should be --1,000--.

Signed and Sealed this

Eleventh Day of November, 2008

JON W. DUDAS
*Director of the United States Patent and Trademark Office*